No. 896,190. PATENTED AUG. 18, 1908.
J. C. YOUNG.
STUFFING BOX.
APPLICATION FILED MAY 7, 1908.
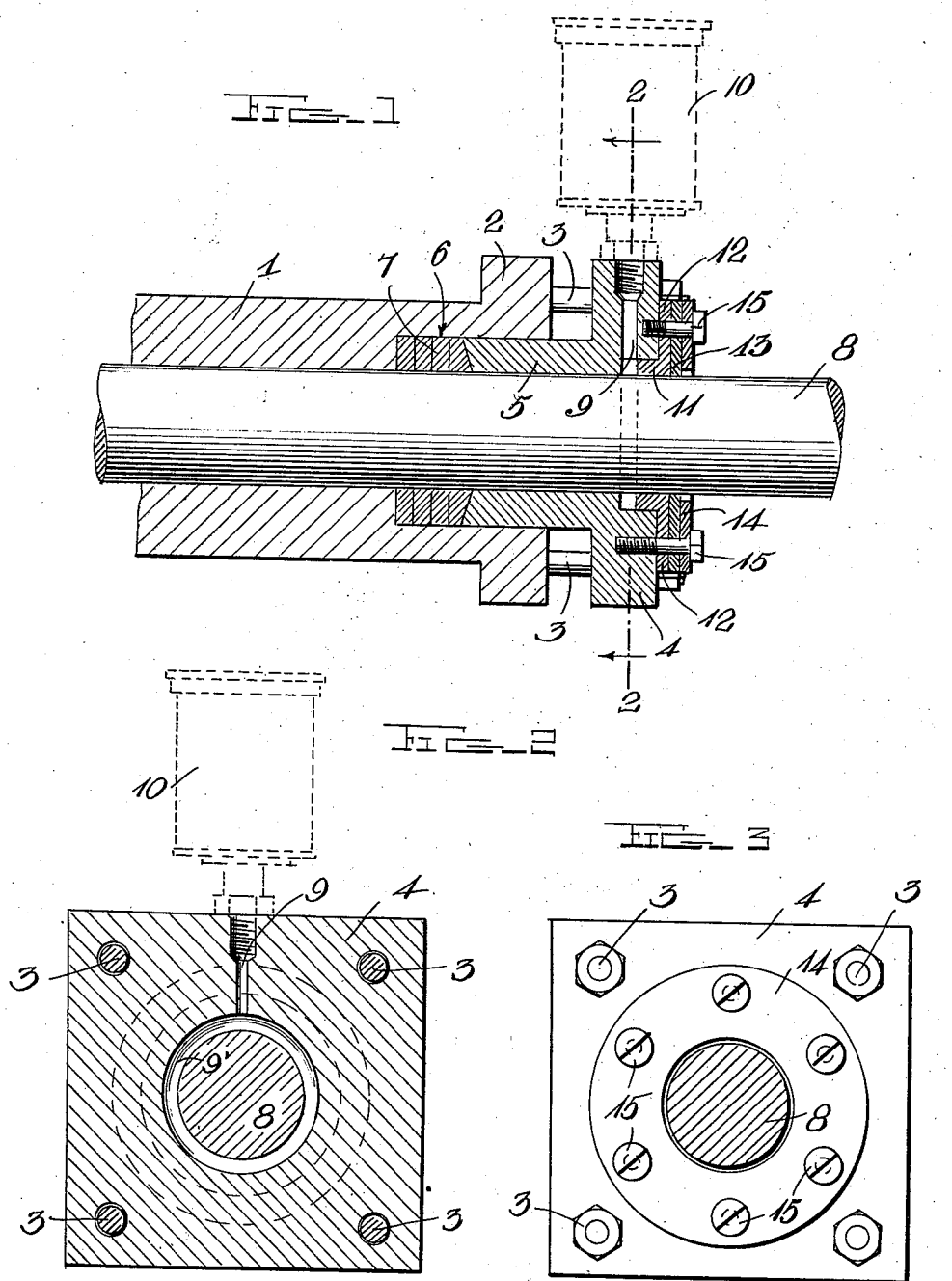
Witnesses
Inventor
J. C. Young

UNITED STATES PATENT OFFICE.

JOHN C. YOUNG, OF PLYMOUTH, PENNSYLVANIA.

STUFFING-BOX.

No. 896,190.  Specification of Letters Patent.  Patented Aug. 18, 1908.

Application filed May 7, 1908. Serial No. 431,463.

*To all whom it may concern:*

Be it known that I, JOHN C. YOUNG, a citizen of the United States, residing at Plymouth, in the county of Luzerne and State of Pennsylvania, have invented certain new and useful Improvements in Stuffing-Boxes; and I do declare the following to be a full, clear, and exact description of the invention, such as will enable others skilled in the art to which it appertains to make and use the same.

This invention relates to stuffing boxes, such as is shown in my Patent #889,740, dated June 2, 1908, and which are designed especially for use in connection with pump plungers, piston rods, and analogous reciprocating members, and has for its objects to provide a comparatively simple and inexpensive device of this character through the medium of which a perfectly tight joint will be formed around the reciprocatory member; one in which the member will be properly lubricated during operation, thus to reduce friction and wear upon the member; one wherein the lubricant will be effectively confined between the packing gaskets, which latter will wipe the member on its out stroke, and one which may be readily cleaned without removing either the shaft or the gland.

With these and other objects in view, the invention comprises the novel features of construction and combination of parts more fully hereinafter described.

In the accompanying drawings,—Figure 1 is a vertical longitudinal sectional view taken centrally through a stuffing box embodying the invention, Fig. 2 is a vertical transverse section, taken on the line 2—2 of Fig. 1, and Fig. 3 is an end elevation of the device.

Referring to the drawings, 1 designates a portion of a pump or other cylinder having an end flange 2, to which is detachably secured by fastening members or bolts 3, the flange 4 of a gland member 5, the tubular portion of which seats in a corresponding recess 6, formed in the flanged end of the cylinder, and confines within said recess a packing gasket 7, there being arranged to work through the cylinder 1 and gland member 5 a plunger or other reciprocatory member 8.

The foregoing parts which are conventionally shown herein may all be of the usual or any appropriate construction and material and are adapted in practice to perform their ordinary functions.

The construction shown herein differs from that shown in the patent above referred to in that means hereinafter described are provided for cleaning out the chamber 9', in which grit which works past the packings accumulates, without removing either the shaft or the gland.

In accordance with the present invention, there is formed vertically through the flanged portion 4 of the gland member a lubricant passage or duct 9, discharging at its inner end into an annular recess or passage 9', formed in the wall of the outer end of the bore or the gland 5. The duct 9 has internal threads for engagement by the stem or shank of a lubricator 10, shown by dotted lines, and which may be of any preferred construction, it being understood in this connection that the lubricant will in practice be discharged in the usual manner under pressure from the cup and through the duct 9 and recess 9' for lubricating the reciprocatory member 8.

A ring or closure 11, composed of any suitable material is arranged to fit within and close the outer portion of the annular recess 9' formed at the outer end of the gland 5, and this ring is provided at its outer end with a laterally extending flange 12, adapted to overlap the outer face of the flange 4 of the gland 5. A gasket or washer 13, is applied to the outer face of the ring 11 and its flange 12 and is confined in place by a metal annulus 14, all of which are detachably secured to the flange 4 of the gland member 5 by screws or other fastenings 15, which may be manipulated for compressing the gasket between the members 4 and 14, thereby causing the packing to bear snugly upon the surface of the plunger or shaft 8.

In practice, any grit which may work past the packings accumulates within the recess 9', and one of the objects of this invention is to so construct the gland to permit the cleaning out of this recess without necessitating the removal of the shaft or the gland itself, and this result is accomplished by forming the recess 9' at the outer end of the gland and closing it at its outer end by means of the ring 11, which is confined in place by the packing ring 13 and the metal annulus 14 held by the screws 15, which pass therethrough and engage screw threaded sockets in the flange 4 of the gland 5. When it is desired to clean out the recess 9' the screws 15 are removed and the ring 12, gasket 13 and annulus 14 are slipped forward on the shaft 8, and after the recess has been thoroughly cleaned these members are again moved into position relatively to the gland and are fastened there by means of the screws 15. The lubricant is discharged through the passage 9 into the annular duct or recess 9', by which it is carried wholly around and distributed to the surface of the reciprocatory member 8 during its movement back and forth through the stuffing box. On the in stroke of the plunger the lubricant will be carried inward in the usual manner, while upon its out stroke the packing ring or gasket 13 will come in contact with the surface of the member 8 and serve to effectually wipe the lubricant therefrom and thus prevent its escape from the stuffing box, and the consequent waste of the lubricant.

By the use of this invention the additional expense of a second gland member is avoided, the same result being accomplished with the washer and metal clamping annulus. It is to be particularly observed that under the construction described the lubricant is effectually confined within the stuffing box between the packing gaskets 7 and 13, where it will act for properly lubricating the member 8 to minimize the friction and reduce the wear on the parts.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention.

1. In a stuffing box, the combination of a cylinder having a recess in its inner face at one end thereof, a gland member fitting within said recess and having an annular recess in its outer end at the inner face thereof, an oil duct communicating with said recess, means for supplying oil to said duct, a gasket arranged between the inner end of said gland member and the rear wall of the recess in said cylinder, means for connecting said gland and cylinder, a shaft running through said gland and cylinder, a ring arranged to close the outer end of the recess in said gland and having a flange overlapping the outer face of said gland, and clamping means for detachably connecting said ring to said gland.

2. In a stuffing box, the combination of a cylinder having a recess in its inner face at one end thereof, a gland member fitting within said recess and having an annular recess in its outer end at the inner face thereof, an oil duct communicating with said recess, means for supplying oil to said duct, a gasket arranged between the inner end of said gland member and the rear wall of the recess in said cylinder, means for connecting said gland and cylinder, a shaft running through said gland and cylinder, a ring arranged to close the outer end of the recess in said gland and having a flange overlapping the outer face of said gland, a packing gasket overlapping said ring and fitting said shaft, a metal annulus for clamping the ring within said recess by pressure upon said gasket, a fastening device passed through the annulus, the gasket and the ring flange to clamp the parts in position.

3. In a stuffing box, the combination with a shaft, of a cylinder having a recess in its inner face near one end thereof, a flange on the outer face of said recessed end, a gland member fitted within said recess and having an annular recess in its outer end on its inner face, a gasket arranged between the inner end of said gland member and the rear wall of said recess in said cylinder, a flange on said gland member, bolts connecting the flanges of said cylinder and gland member, a shaft running through said cylinder and gland member, a ring arranged in the outer end of the recess of said gland member and having a flange overlapping the outer face of the flange of said gland member, a packing washer overlapping the closure of the gland member and fitting the shaft, a metal annulus clamping the closure within the gland member by pressure upon the washer, bolts passing through the annulus, the washer and the flange of the closure to clamp the parts in position, and an oil duct communicating with the recess in said gland member.

In testimony whereof I have hereunto set my hand in presence of two subscribing witnesses.

JOHN C. YOUNG.

Witnesses:
BENJ G. COWL,
C. H. GRIESBAUER.